United States Patent Office 3,048,162
Patented Aug. 7, 1962

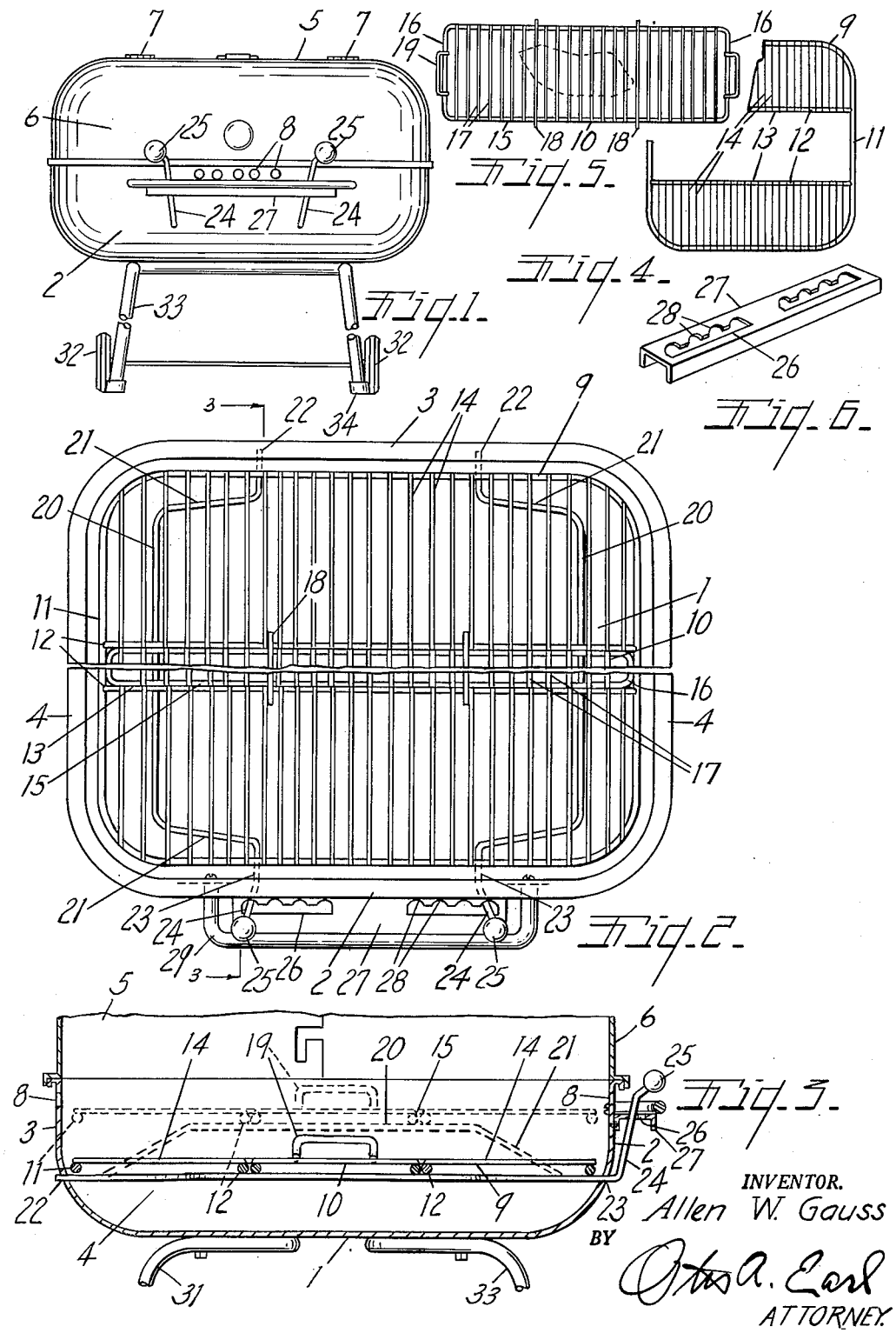

3,048,162
PORTABLE BARBECUE
Allen W. Gauss, Albion, Mich., assignor to Union Steel
Products Company, Albion, Mich.
Filed Feb. 10, 1960, Ser. No. 7,785
6 Claims. (Cl. 126—25)

This invention relates to grills of the outdoor type.
The main objects of this invention are:

First, to provide a grill which is capable of a wide range of adjustment for adaptation to cooking various food products which quite commonly require variation in the positioning thereof relative to the fire both for adaptation to the condition of the fire and also for products in varying kinds and conditions.

Second, to provide a grill having these advantages, a grid having a removable section which is adapted to support certain products to be cooked and also to afford access to the fire, particularly where the products being cooked are mounted on other portions of the grid.

Third, to provide a grill having a wide range of adaptability for cooking various products and a wide range of adjustment during cooking thereof.

Objects relating to details and economies of the invention will appear from the description to follow. The invention is defined and pointed out in the claims.

A preferred embodiment of the invention is illustrated in the accompanying drawing, in which:

FIG. 1 is a front elevational view of a grill in closed position embodying my invention, the legs being partially broken away.

FIG. 2 is a fragmentary plan view with the hood removed.

FIG. 3 is a fragmentary view in vertical section on a line corresponding to line 3—3 of FIG. 2.

FIG. 4 is a fragmentary plan view of the grid unit, parts of the grid being shown conventionally.

FIG. 5 is a plan view of the auxiliary grid unit.

FIG. 6 is a perspective view of the keeper member.

The embodiment of my invention illustrated comprises a fire pan including a bottom 1, front wall 2, rear wall 3 and end walls 4, these walls being arranged to provide a generally rectangular fire pan of substantial depth, the walls and bottom desirably curvedly merging as is illustrated in the drawing.

The structure illustrated is provided with a hood which includes the rear section, designated generally by the numeral 5, and the front section which is designated generally by the numeral 6. The top wall of the front section is connected to the top wall of the rear section by the hinges 7 so that it may be swung on its hinges to fully open position in supported relation to the rear section or it may be swung forwardly to closed position, as is illustrated in FIGS. 1 and 3. In the embodiment illustrated, the front wall is provided with air inlets 8.

The grid of this invention comprises a main grid unit designated generally by the numeral 9 and an auxiliary grid unit designated generally by the numeral 10, see FIGS. 2, 4 and 5. The main grid unit includes the border frame 11 dimensioned to fit within the fire pan with its edges in spaced relation to the walls thereof.

The crossbars 12 are secured to the end member of the border frame in laterally spaced relation to provide longitudinal openings 13 in the grid of substantial width. The slats 14 are fixedly secured at their outer ends to the side members of the border frame and at their inner ends to the crossbars.

The auxiliary grid unit comprises the border frame including the parallel side bars 15, the connecting end members 16 and the slats 17. Certain of these slats are extended to provide supporting lugs 18 which rest upon the crossbars 12 with the side members 15 disposed between the crossbar 12 of the main grid member so that the ends of the slats are in substantially the same plane. The auxiliary grid unit is provided with handles 19 at its ends. With this arrangement the auxiliary grid unit may be removed from the main grid unit with articles that may be positioned thereon for cooking or to afford access to the fire in the fire pan.

The grid is supported for adjustment relative to the fire of the fire pan both for vertical adjustment relative to the fire or for tilting adjustment relative to the fire pan. This adjustment is desirable to meet varying fire conditions of the fire pot and for particular products being cooked and varying stages in the cooking thereof. The adjusting means comprises the support members 20 provided with laterally projecting arms 21 having journals 22 in their rear ends engaged in the rear wall of the fire pan and journaled at 23 on their front end in the fire pan and terminating in upwardly projecting arms 24 provided with hand pieces or grip pieces 25 on their upper ends. These arms 24 project through the slots 26 in the keeper plate 27, the plate at the inner edges of the slots being notched to provide a plurality of keepers 28 with which the arms may be selectively engaged, and the arms being springable so that they are effectively retained in the keeper in which they are engaged. The handle 29 is disposed above and extends forwardly of the keeper member and constitutes a guard for the keeper member and the arms engaged therewith.

In the embodiment illustrated the grill is provided with supporting legs, the rear legs 31 being provided with wheels 32 and the front legs 33 have foot pieces 34 which engage the surface upon which the grill is supported to prevent movement of the grill from its adjusted position. With this arrangement of parts the grill is supported for a wide range of adjustment to meet varying conditions which may be desirable both from the standpoint of the fire conditions and the product being cooked.

I have not attempted to illustrate and describe various adaptations and modifications which I contemplate as it is believed that this disclosure will enable those skilled in the art to embody or adapt the invention as may be desired.

Having thus described the invention, what is claimed as new and desired to secure by Letters Patent is:

1. An outdoor grill comprising a fire pan including a bottom, front, rear and side walls, a grid, means for adjustably supporting said grid within said fire pan comprising a pair of support members having laterally projecting arms journaled in said front and rear fire pan walls, the front journals being extended through the front fire pan wall and terminating at their outer ends in integral upwardly projecting actuating arms, a keeper member mounted on the fire pan front wall slotted to receive said arms, the inner edges of the slots being notched to provide a series of keepers with which said arms are springably and selectively engageable, and a handle for said grill mounted on said fire pan front wall above said keeper member and constituting a guard for said actuating arms, said actuating arms having hand pieces disposed above said handle.

2. An outdoor grill comprising a fire pan including a bottom, front, rear and side walls, a grid having a central transverse opening therein defined by laterally spaced parallel grid crossbars, an elongated auxiliary grid unit complementing said main grid unit and having supporting lugs supportingly and releasably engageable with said main grid unit, means for supporting said grid journaled in said fire pan comprising support members having laterally offset journals journaled in said fire pan walls, the front journals being extended through the fire pan walls in which they are journaled and terminating in projecting actuating arms, and keeper members mounted on said fire pan wall to coact with said arms and having a plurality of keepers therein with which said arms are selectively engageable.

3. A grill comprising a fire pan including a bottom, front, rear and side walls, the walls including vertically disposed portions of substantial width, one wall of the fire pan having air inlets therein, a grid disposed within the walls of the fire pan and comprising a main grid unit including a unitary border frame having integral front, rear and side members disposed adjacent corresponding walls of the fire pan but spaced therefrom permitting vertical adjustment of the grid unit within the fire pan walls, crossbars fixedly mounted on the side members of said border frame in laterally spaced relation to each other and to the front and rear members of the border frame, slats fixedly connected to said crossbars and to the opposite members of the border frame, said crossbars being spaced relative to each other to provide an opening in the main grid unit affording access to the fire pan through the main grid unit and to receive an auxiliary grid unit between them, an auxiliary grid unit complementing said main grid unit and including a border frame having parallel side members spaced to be disposed between and in lateral thrust supported relation to said main grid unit crossbars when assembled therewith and slats fixedly connected thereto and having laterally projecting supporting lugs supportedly and releasably engageable with said crossbars of said main grid unit, said auxiliary grid unit having handles at the ends thereof, and manually adjustable means for vertically and tiltably adjusting said grid within said fire pan walls.

4. A grill comprising a fire pan including a bottom, front, rear and side walls, the walls including vertically disposed portions of substantial width, one wall of the fire pan having air inlets therein, a grid disposed within the walls of the fire pan and comprising a main grid unit including a unitary border frame having integral front, rear and side members disposed adjacent corresponding walls of the fire pan but spaced therefrom permitting vertical adjustment of the grid unit within the fire pan walls, crossbars fixedly mounted on the side members of said border frame in laterally spaced relation to each other and to the front and rear members of the border frame, slats fixedly connected to said crossbars and to the opposite members of the border frame, said crossbars being spaced relative to each other to provide an opening in the main grid unit affording access to the fire pan through the main grid unit and to receive an auxiliary grid unit between them, an auxiliary grid unit complementing said main grid unit and including a border frame having parallel side members spaced to be disposed between said main grid unit crossbars when assembled therewith and slats fixedly connected thereto and having support members supportedly and releasably engageable with said main grid unit, said auxiliary grid unit having handles at the ends thereof, and manually adjustable means for adjusting said grid within said fire pan walls.

5. A grill comprising a fire pan including walls of substantial vertical width, a grid disposed within the walls of the fire pan for vertical adjustment therein and comprising a main grid unit including a border frame corresponding in shape to the cross sectional shape of the fire pan and vertically adjustable therein, crossbars fixedly mounted on said border frame in laterally spaced relation to each other, slats fixedly connected to said crossbars and to portions of the border frame opposed to said crossbars, said crossbars being spaced relative to each other to provide an opening in the main grid affording access to the fire pan and to receive an auxiliary grid unit of substantial width between them, an auxiliary grid unit complementing said main grid unit and constituting a closure for the opening therein between said crossbars and including side members, and slats fixedly secured to said side members, said auxiliary grid unit having laterally projecting supporting lugs supportedly and releasably engageable with said crossbars on said main grid unit, said auxiliary grid unit having handles at the ends thereof and manually operable supporting means for vertically and tiltably adjusting said grid within said fire pan.

6. A grill comprising a fire pan including walls of substantial vertical width, a grid disposed within the walls of the fire pan for vertical adjustment therein and comprising a main grid unit including a border frame corresponding in shape to the cross sectional shape of the fire pan and vertically adjustable therein, crossbars fixedly mounted on said border frame in laterally spaced relation to each other, slats fixedly connected to said crossbars and to portions of the border frame opposed to said crossbars, said crossbars being spaced relative to each other to provide an opening in the main grid affording access to the fire pan and to receive an auxiliary grid unit of substantial width between them, an auxiliary grid unit complementing said main grid unit and constituting a closure for the opening therein between said crossbars and including side members, and slats fixedly secured to said side members, said auxiliary grid being releasably engageable with said main grid unit, and manually operable supporting means for adjusting said grid within said fire pan.

References Cited in the file of this patent

UNITED STATES PATENTS

| | | |
|---|---|---|
| D. 180,740 | Lowry | Aug. 6, 1957 |
| D. 182,743 | Rodman | May 6, 1958 |
| 1,708,504 | Hunt | Apr. 9, 1929 |
| 1,861,689 | Dibble et al. | June 7, 1932 |
| 1,922,585 | Hoffsetter et al. | Aug. 15, 1933 |
| 2,325,828 | Betts | Aug. 3, 1943 |
| 2,477,546 | Reeves | July 26, 1949 |
| 2,552,861 | Overman | May 15, 1951 |
| 2,608,190 | Winning et al. | Aug. 26, 1952 |
| 2,747,567 | Goodwin | May 29, 1956 |
| 2,806,564 | Smith | Sept. 17, 1957 |
| 2,986,138 | Moore et al. | May 30, 1961 |